United States Patent Office 3,561,914
Patented Feb. 9, 1971

3,561,914
PROCESS FOR DYEING NATURAL NITROGENOUS FIBROUS MATERIAL AND A PREPARATION THEREOF
Heinz Abel and Alfred Berger, Reinach, Basel-Land, Switzerland, assignors to Ciba Limited, Basel, Switzerland, a company of Switzerland
No Drawing. Filed June 25, 1968, Ser. No. 739,637
Claims priority, application Switzerland, July 7, 1967, 9,706/67
Int. Cl. D06p 3/14
U.S. Cl. 8—43                                    11 Claims

ABSTRACT OF THE DISCLOSURE

A process for dyeing natural nitrogenous fibers with water-soluble 1:2 metal-complex dyestuffs wherein dyeing is performed at 70 to 85° C. in the presence of (a) a water soluble salt of tetraboric acid and (b) a nitrogen containing polyglycol derivative of an aliphatic compound of high molecular weight in the form of an acid ester of an at least dibasic oxygen acid or a salt thereof.

The present invention provides a process for dyeing natural nitrogenous fibrous material from acid to neutral baths with water-soluble 1:2-metal complex dyestuffs that contain no free acid groups imparting solubility in water. The process is characterized in that dyeing is performed at 70 to 85° C., under otherwise conventional conditions, is the presence of (a) water-soluble salts of tetraboric acid and
(b) acid esters, or their salts, of at least dibasic oxygen acids and polyglycol compounds of aliphatic compounds of high molecular weight that contain at least one basic nitrogen atom.

From among natural nitrogenous fibrous materials those of animal origin are specially suitable, for example leathers, furs, pelts, for example sheepskins, hairs, for example human hair, goat's hair, buffalo hair, camel hair, hare or rabbit hair, feathers, angora wool and especially wool. These fibrous materials may be in various stages of processing, for example as skins as in the case of leather, or they may be loose, yarns, knitted or woven materials.

The water-soluble 1:2-metal complex dyestuff suitable for use according to this invention contain no free acid groups imparting solubility in water, that is to say they contain no free sulphonic acid groups or carboxyl groups not participating in the complex formation. As central atom they contain, for example, a cobalt or preferably a chromium atom. The central atom is linked with two complex-forming components of which at least one is a dyestuff molecule, or preferably both are dyestuff molecules. Suitable dyestuff molecules are especially azo dyes that contain in ortho, ortho'-position to the azo bridge one substituent each capable of complex formation. The two dyestuff molecules participating in the complex formation may be identical or different and contain only one or more than one azo bridge. Suitable complex-forming substituents are, for example, the hydroxyl, amino, carboxyl, carbomethoxy or methoxy group. Specially suitable are, for example, dyestuffs containing one of the following groupings: ortho, ortho'-diaminoazo, ortho-hydroxy-ortho'-aminoazo, ortho-carboxy-ortho'-hydroxyazo or -aminoazo, ortho-carbomethoxy-ortho'-hydroxyazo, ortho - carbomethoxy-ortho'-aminoazo and more particularly the ortho-ortho'-dihydroxyazo grouping. Suitable groups imparting solubility in water are non-dissociating, functionally modified groups that are free from acid groups, for example sulphonic acid groups or carboxyl groups not participating in the complex formation. Such derivatives are, for example, sulphonamide or alkylsulphone groups.

Dyeing is carried out in the presence of a combination of assistants.

The constituent (a) of the combination is water-soluble salts, of tetraboric acid which is unknown in free form; they are mainly ammonium or alkali metal salts, of which the sodium salt is preferred. It is known by the name of borax, has the formula $Na_2B_4O_7$ and generally takes the form of the decahydrate or pentahydrate. However, it is not imperative to add these salts to the dyebath as such; they may have been first formed in the dyebath, for example by dissolving boric acid in a neutral bath and neutralizing with sodium carbonate.

The amounts in which these salts are to be used may vary within relatively wide limits and are within the range from 2 to 10% of the weight of the dry dyeing material.

The constituent (b) of the combination is acid esters or salts thereof with an at least dibasic oxygen acid and polyglycol compounds of aliphatic compounds of high molecular weight containing at least one basic nitrogen atom. Preferred use is made of polyglycol compounds of aliphatic amines of high molecular weight containing an aliphatic hydrocarbon residue with 12 to 22 carbon atoms. These hydrocarbon residues may be saturated or unsaturated, branched or preferably linear. They contain preferably 16 to 22 carbon atoms. Suitable amines are chemically unitary higher alkylamines or mixtures of different alkylamines of high molecular weight. Preferred amine mixtures are those obtained when natural fats or oils, for example tallow fat, soybean oil, castor oil or coconut oil, are converted into the corresponding amines. As such amines there may be specifically mentioned dodecylamine, hexadecylamine, octadecylamine, arachidylamine [$H_3C—(CH_2)_{19}—NH_2$], behenylamine

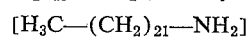
[$H_3C—(CH_2)_{21}—NH_2$]

and octadecenylamine. Furthermore, there should be mentioned monoalkyl-alkylenediamines whose alkyl residue contains 12 to 24 and the alkylene residue 2 to 3 carbon atoms. The alkyl residues in this connection may have the same composition as those mentioned with the above monamines. The amino group or groups is or are linked with 2 to 30, preferably 6 to 9 alkenoxy groups. Suitable alkenoxy compounds are, for example, low-molecular compounds such as ethylene oxide, propylene oxide, butylene oxide, or higher compounds such as dodecene oxide, olefin oxide with 16 to 18 carbon atoms or styrene oxide. The reaction with the amines may be carried out with a single alkylene oxide or with a mixture of different alkylene oxides. Owing to its readier accessibility propylene oxide in mixtures with ethylene oxide is given preference over other alkylene oxides. At least a substantial share of the

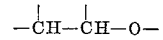
$$—\overset{|}{C}H—\overset{|}{C}H—O—$$

groups thus formed should be ethenoxy groups. Therefore, unless ethylene oxide exclusively is added on to the amines, it is advantageous to use for every mol of amine only 1 to 3 mols of propylene oxide or styrene oxide and at least 3 mols of ethylene oxide.

The acid esters are advantageously derived from polyglycol compounds of the formula (1) 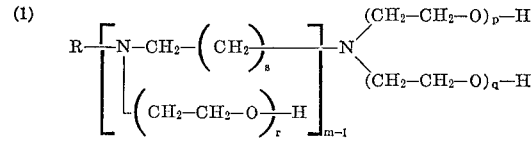

in which R represents an aliphatic, advantageously linear, hydrocarbon residue containing 12 to 24 carbon atoms, $m$ and $s$ each is 1 or 2, and $p$, $q$ and $r$ are digits, the sum $p+q+r(m-1)$ being at least 2 and at most 30.

The esterification is performed by any one known method. Advantageously, it is performed with functional derivatives of at least dibasic oxygen acids under such conditions that at least one acid ester group is introduced, advantageously in form of an alkali metal, ammonium or amine salt. Suitable polybasic organic acids for the formation of the acid esters are organic polycarboxylic acids or carboxylic acid-sulphonic acids, for example maleic acid or succinic acid-sulphonic acid, or polybasic inorganic oxygen acids such as phosphoric or preferably sulphuric acid, or functional derivatives of such acids, such as their anhydrides, halides or amides. The acid sulphuric acid esters are advantageously manufactured directly in form of their ammonium salts by heating the starting materials with amidosulphonic acid in the presence of urea. Accordingly, suitable esters contain at least one acid ester group in the molecule. Otherwise, there may be used compounds of which some or preferably all hydroxyl groups are esterified. Particularly suitable acid esters correspond to the formula

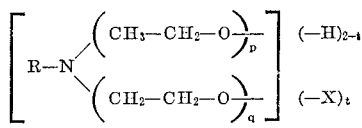

in which R represents an aliphatic hydrocarbon residue containing 12 to 24, preferably 16 to 22 carbon atoms; X represents the residue left on elimination of a hydroxyl group from an at least dibasic oxygen acid; $t=1$ or 2 and $p$ and $q$ are digits, the sum $(p+q)$ being at least 2 and at most 30, preferably 6 to 9. The above-mentioned acid esters may also be used in form of their quaternated products in the process of this invention. Since dyeing is performed in an acid dyebath, the basic nitrogen is present in protonized and therefore quaternated form. Alternatively, if desired, these compounds may first be quaternated with the usual alkylating agents, for example dimethylsulphate or chloroacetamide, then added to the dyebath in the pre-quaternated form.

The amount of acid esters to be used ranges from 0.3 to 3%, preferably from 0.5 to 1% of the weight of the dry dyeing material.

It goes without saying that the constituents (a) and (b) may also be added to the dyebath in form of a preparation containing the constituents (a) and (b) in the aforementioned proportions, the ratio (a):(b) being from 1:1.5 to 1:0.03.

Dyeing proper is performed by the exhaustion method at 70 to 85° C., preferably at 75 to 83° C. The ratio dry goods-to-liquor may vary within wide limits and is, for example, from 1:5 to 1:50. The performance of the present process does not require any special apparatus, and the usual dyeing apparatus such, for example, as open vats, jigs, paddle-type or circulatory dyers, or winch vats may be used. The dyeing time is within the usual range of exhaustion dyeing times and is, as a rule, from 20 to 120 minutes. The dyeings are finished off in the usual manner by a cold to hot rinse and drying.

The dyebaths are adjusted to a pH value of at most 6, advantageously with the aid of acids, for example inorganic acids such as sulphuric or phosphoric acid, or organic acids such as acetic or formic acid.

Apart from the ingredients indicated above the dyebath may contain the usual dyebath additives, for example other levelling agents, dispersants or salts, to mention just a few. As salts there may be used, inter alia, sodium sulphate or acetate.

The main advantages of the present process are, in the first place, that the material can be dyed in a mild manner from light pastel shades to saturated, deep shades. The mild conditions in which the fibres are treated according to this invention find their expression in the fact that a yellowing, for example of wool, is substantially or completely obviated. It is also possible to dye without any shrinking a fibre mixture with fibres that tend to shrink, for example polyvinyl chloride fibres.

Parts and percentages in the following examples are by weight.

EXAMPLE 1

100 kilograms of wool yarn are dyed in a yarn dyeing machine in a liquor of the following composition:

2000 kg. of water
4 kg. of borax
2 kg. of glacial acetic acid
1 kg. of the preparation described further on
2 kg. of the 1:2-chromium complex with two molecules of the dyestuff of the formula

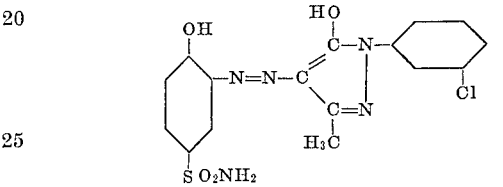

The material to be dyed is first wetted for 15 minutes in the liquor heated at 50° C. which does not yet contain the dyestuff. The dyestuff is then added and the whole heated within 50 minutes to 80±2° C. and dyeing is performed for 90 minutes at this temperature, then rinsed in cold water, centrifuged and dried. The resulting level orange-red dyeing has good wet fastness properties.

The preparation used above is prepared thus:

116 parts of an adduct of 1 mol of tallow fat amine with 7 mols of ethylene oxide are mixed at 60 to 65° C. with 21.4 parts of urea and 42.8 parts of amidosulphonic acid. The temperature is then raised to 95 to 100° C. and thus maintained for 6 hours. Then 130 parts of water are added, whereupon a 50% aqueous solution of the ammonium salt of the di-sulphuric acid ester of the tallow fat amine/ethylene oxide condensate used as starting material is obtained.

Instead of the preparation described above, equal quantities of the following preparations manufactured in identical manner may be used: with equally good results.

(a) 50% aqueous solution of the ammonium salt of the mono-sulphuric acid ester of the condensation product of 1 mol of tallow fat amine with 7 mols of ethylene oxide;

(b) 50% aqueous solutions of the ammonium salt of the di-sulphuric acid ester of the condensation product of 1 mol of tallow fat amine with 2 mols of ethylene oxide;

(c) 46%–47% aqueous solution of the ammonium salt of the di-sulphuric acid ester of the condensation product of 1 mol of tallow fat amine with 4 mols of ethylene oxide;

(d) 25% aqueous solution of the ammonium salt of the di-sulphuric acid ester of the condensation product of 1 mol of dodecylamine with 5 mols of ethylene oxide;

(e) 50% aqueous solution of the ammonium salt of the di-sulphuric acid ester of the condensation product of 1 mol of aminopropyl-soybean fat amine with 8 mols of ethylene oxide;

(f) 50% aqueous solution of the ammonium salt of the di-sulphuric acid ester of the adduct of 30 mols of ethylene oxide with 1 mol of a fatty amine containing about 10% of stearylamine, 55% of arachidylamine and 35% of behenylamine;

(g) 50% aqueous solution of the ammonium salt of the di-sulphuric acid ester of an adduct of 1 mol of tallow fat amine and 1 mol of styrene oxide, 1 mol of propylene oxide and then 21 mols of ethylene oxide.

Instead of adding borax and the assistant to the dyebath separately as described above, an aqueous solution of the assistant may be intimately mixed with borax to form a soft paste of which a suitable quantity is included in the dye preparation.

Equivalent dyeings are obtained when the above dyestuff is replaced by one of the following dyestuffs:

1:2-chromium complex with 2 mols of the dyestuff of the formula

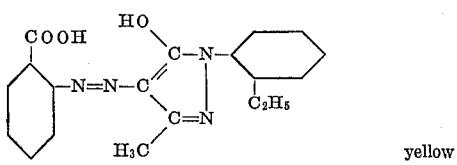
yellow

1:2-cobalt complex with 1 mol each of the dyestuffs of the formulae

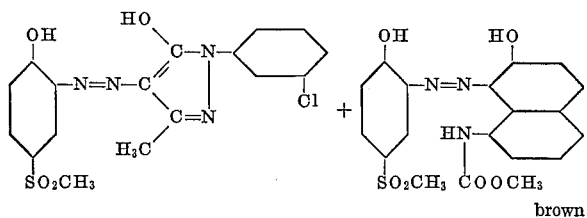
brown

1:2-chromium complex with 2 mols of the dyestuff of the formula

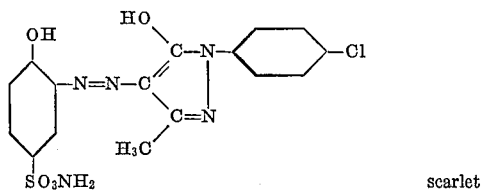
scarlet

1:2-chromium complex with 2 mols of the dyestuff of the formula

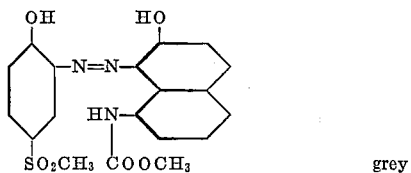
grey

1:2-cobalt complex with 1 mol each of the dyestuffs of the formula

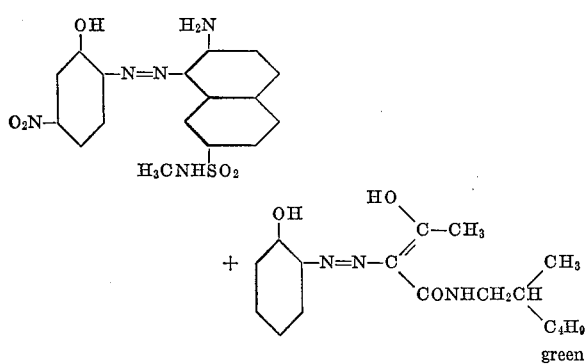
green

EXAMPLE 2

100 kg. of wool slubbings are dyed in a circulation vat in the following dyebath:

1500 kg. of water
4 kg. of borax
4 kg. of acetic acid of 80% strength
2 kg. of one of the preparations described in Example 1

1 kg. of the 1:2-cobalt complex with 2 molecules of the dyestuff of the formula

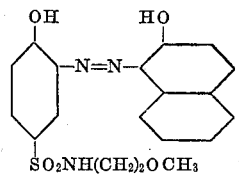

Dyeing is performed as described in Example 1, except that the time taken to heat up to 80±2° C. and the actual dyeing time each is 60 minutes. Finishing off is performed by rinsing in a back-washing machine followed by drying. A level claret tint is obtained which has good properties of fastness.

EXAMPLE 3

100 kilograms of angora goat's hair are dyed in a dyebath of the following composition:

2000 kg. of water
4 kg. of boric acid which has been neutralized with sodium bicarbonate before being added to the dyebath
3 kg. of glacial acetic acid
1 kg. of the preparation described below
1 kg. of the 1:2-cobalt complex with 1 molecule each of the dyestuffs (a), (b) and/or (c):

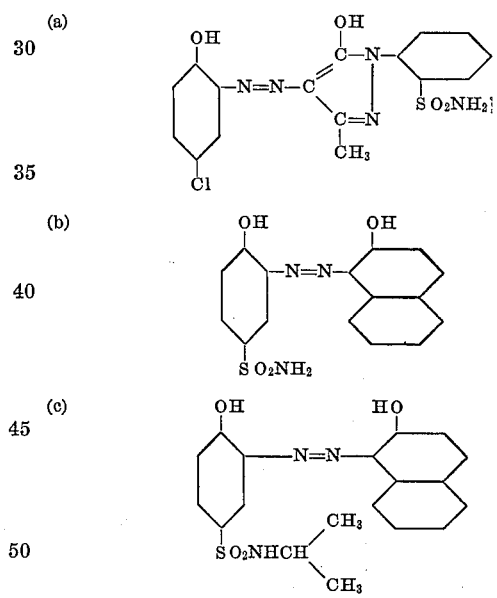

The hairs are wetted for 10 minutes in water heated at 50° C. and then dyed for 1 hour at 80° C. with the dye preparation described above after having heated the liquor within 30 minutes to 80° C. The hairs are then thoroughly rinsed. The angora hairs are dyed a fast, level red-brown shade.

The preparation used above is manufactured thus:

80 parts of an adduct of 1 mol of stearylamine and 30 mols of ethylene oxide are dissolved in 80 parts of carbon tetrachloride and then dropped at 30 to 40° C. into a solution of 15.4 parts of phosphorus oxychloride in 85 parts of carbon tetrachloride. After about 10 minutes carbon tetrachloride is distilled off. The cold batch is mixed dropwise with 40 parts of 30% sodium hydroxide solution and then with 80 parts of water, heated for 1 hour under reflux at 95 to 100° C., neutralized with dilute sulphuric acid and made up to 372 parts with water.

The resulting 25% solution contains the sodium salt of the adduct.

Instead of the preparation described above equal amounts of the preparation mentioned under 1(f) or 1(g) may be used.

EXAMPLE 4

100 kilograms of a woollen fabric are dyed in the following dyebath:

400 kg. of water
4 kg. of borax
1 kg. of one of the preparations described in Example 1
0.3 kg. of the 1:2-cobalt complex with two molecules of the dyestuff of the formula

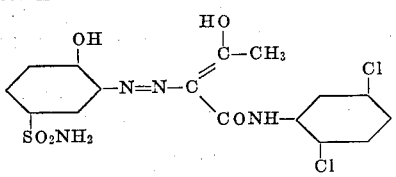

The woollen fabric is first wetted in a winch vat with water heated at 50° C. The pH value of the dyebath is adjusted to 6 with acetic acid.

The whole is then heated within 45 minutes to 80° C. and the fabric is dyed at this temperature for 60 minutes, then thoroughly rinsed. The dyed wool displays a fast, level yellow shade.

EXAMPLE 5

100 kilograms of wool yarn are immersed in the dyebath contained in a hank dyeing apparatus. The dyebath is composed of 2000 kg. of water
4 kg. of borax
2.5 kg. of glacial acetic acid
5 kg. of Glauber's salt (calcined)
1 kg. of the preparation described below
1.5 kg. of the 1:2-cobalt complex with one molecule each of the dyestuffs of the formulae

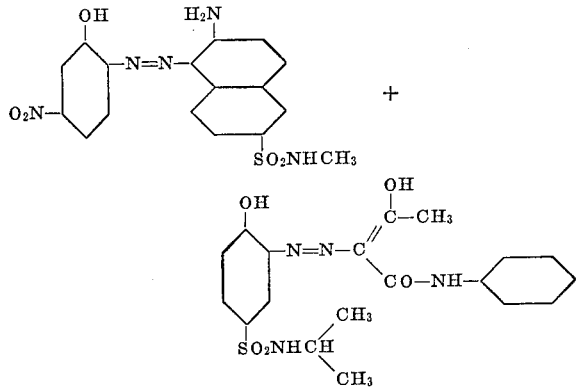

The dyebath has at first a temperature of 50° C.; it is heated within 40 minutes to 80° C. and dyeing is performed for 30 minutes at this temperature. The rinsed and dried yarn is dyed a level green shade of good fastness properties.

The preparation used above is manufactured thus:

580 parts (1 mol) of an adduct of 7 mols of ethylene oxide with 1 mol of a commercial fat amine consisting of 35% of hexadecylamine, 25% of octadecylamine and 45% of octadecenylamine are heated to 60 to 65° C. In the course of 30 minutes 145 parts of chloroacetamide are stirred in and then within another 15 minutes 107 parts of urea and within 30 minutes 107 parts of amidosulphonic acid. The whole is then heated within 1 hour to 95° C. and then stirred for 6 hours at 95 to 98° C. The reaction mixture is then taken up in water, to furnish a solution of about 50% strength of the compound

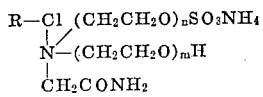

in which $(n+m)$ is on an average equal to 7.

What is claimed is:

1. A process for dyeing natural nitrogenous fibrous material in an acid to neutral bath with water soluble 1:2 metal complex dyestuffs that contain no free acid groups imparting solubility in water, which process comprises dyeing at 70 to 85° C. in the presence of (a) an alkali metal or ammonium salt of tetraboric acid and (b) an acid derivative selected from the group consisting of acid esters and acid ester salts, of at least dibasic oxygen acids and polyglycol compounds of aliphatic compounds having hydrocarbon residues with 12 to 22 carbon atoms and containing at least one basic nitrogen atom.

2. A process according to claim 1 for dyeing natural nitrogenous fibrous material in an acid to neutral bath with water soluble 1:2 metal complex dyestuffs that contain no free acid groups imparting solubility in water, which process comprises dyeing wool.

3. A process according to claim 1 for dyeing natural nitrogenous fibrous material in an acid to neutral bath with water soluble 1:2 metal complex dyestuffs that contain no free acid groups imparting solubility in water, which process comprises dyeing at 75 to 83° C. by the exhaustion method.

4. A process according to claim 1 for dyeing natural nitrogenous fibrous material in an acid to neutral bath with water soluble 1:2 metal complex dyestuffs that contain no free acid groups imparting solubility in water, which process comprises using a 1:2 metal complex dyestuff selected from the group consisting of 1:2 chromium and 1.2 cobalt complexes of azo dyestuffs.

5. A process according to claim 1 for dyeing natural nitrogenous fibrous material in an acid to neutral bath with water soluble 1:2 metal complex dyestuffs that contain no free acid groups imparting solubility in water, which process comprises using borax as component (a).

6. A process according to claim 1 for dyeing natural nitrogenous fibrous material in an acid to neutral bath with water soluble 1:2 metal complex dyestuffs that contain no free acid groups imparting solubility in water, which process comprises using as component (b) an acid derivative selected from the group consisting of acid esters and acid ester salts, of at least dibasic oxygen acids and condensation products of 1 mol of an aliphatic amine whose aliphatic hydrocarbon residue contains 12 to 22 carbon atoms, with 2 to 30 mols of ethylene oxide.

7. A process according to claim 1 for dyeing natural nitrogenous fibrous material in an acid to neutral bath with water soluble 1:2 metal complex dyestuffs that contain no free acid groups imparting solubility in water which process comprises using as component (b) an acid derivative selected from the group consisting of acid sulphuric acid esters and acid sulphuric acid ester salts of compounds of the formula

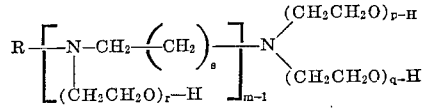

in which R represents an aliphatic hydrocarbon residue containing 12 to 22 carbon atoms, $m$ and $s$ each is 1 or 2, and $p$, $q$ and $r$ are digits, the sum $p+q+r(m-1)$ being at least 2 and at most 30.

8. A process according to claim 1 for dyeing natural nitrogenous fibrous material in an acid to neutral bath with water soluble 1:2 metal complex dyestuffs that contain no free acid groups imparting solubility in water, which process comprises using as component (b) a polyglycol derivative of a mixture of different aliphatic amines containing hydrocarbon residues with 12 to 22 carbon atoms as are obtained on manufacturing amines from natural fats or oils.

9. A process according to claim 1 for dyeing natural nitrogenous fibrous material in an acid to neutral bath with water soluble 1:2 metal complex dyestuffs that contain no free acid groups imparting solubility in water, which process comprises using as component (b) the ammonium salt of the di-sulphuric acid ester of the condensation product of 1 mol of tallow fat amine with 6 to 9 mols of ethylene oxide.

10. A process according to claim 1 for dyeing natural nitrogenous fibrous material in an acid to neutral bath with water soluble 1:2 metal complex dyestuffs that contain no free acid groups imparting solubility in water, which process comprises dyeing in dyebaths having a pH-value not exceeding 6.

11. A preparation suitable for performing the process according to claim 1 for dyeing natural nitrogenous fibrous material in an acid to neutral bath with water soluble 1:2 metal complex dyestuffs that contain no free acid groups imparting solubility in water, which preparation contains (a) a water soluble salt of tetraboric acid and (b) at least one acid derivative selected from the group consisting of acid esters and acid ester salts of an at least dibasic oxygen acid with polyglycol compounds of aliphatic compounds of high molecular weight containing at least one basic nitrogen atom.

References Cited
UNITED STATES PATENTS

| | | | |
|---|---|---|---|
| 3,012,842 | 12/1961 | Aeberhardt et al. | 8—42 |
| 2,470,080 | 5/1949 | Millson et al. | 8—43 |
| 3,190,871 | 6/1965 | Auerbach et al. | 8—43X |
| 3,202,649 | 9/1965 | Steinemann | 8—43X |

GEORGE F. LESMES, Primary Examiner

P. C. IVES, Assistant Examiner

U.S. Cl. X.R.

8—82, 173